US012576935B1

(12) United States Patent
Kim

(10) Patent No.: US 12,576,935 B1
(45) Date of Patent: Mar. 17, 2026

(54) TRICYCLE HAVING MAXIMUM TILTABLE ANGLE VARIABLE SYSTEM

(71) Applicant: Yong N Kim, Bayside, NY (US)

(72) Inventor: Yong N Kim, Bayside, NY (US)

( * ) Notice: Subject to any disclaimer, the term of this patent is extended or adjusted under 35 U.S.C. 154(b) by 0 days.

(21) Appl. No.: 19/385,567

(22) Filed: Nov. 11, 2025

(51) Int. Cl.
| | |
|---|---|
| *B62K 5/10* | (2013.01) |
| *B62J 1/08* | (2006.01) |
| *B62K 5/06* | (2006.01) |
| *B62K 21/02* | (2006.01) |
| *B62K 21/18* | (2006.01) |
| *B62L 3/02* | (2006.01) |
| *B62M 1/36* | (2013.01) |
| *B62M 3/08* | (2006.01) |
| *B62M 9/06* | (2006.01) |
| *B62M 25/04* | (2006.01) |

(52) U.S. Cl.
CPC .................. *B62K 5/10* (2013.01); *B62J 1/08* (2013.01); *B62K 5/06* (2013.01); *B62K 21/02* (2013.01); *B62K 21/18* (2013.01); *B62L 3/02* (2013.01); *B62M 1/36* (2013.01); *B62M 3/08* (2013.01); *B62M 9/06* (2013.01); *B62M 25/04* (2013.01)

(58) Field of Classification Search
CPC . B62K 5/10; B62K 5/06; B62K 21/02; B62K 21/18; B62M 1/36; B62M 3/08; B62M 9/06; B62M 25/04; B62J 1/08
USPC .......................................... 280/282, 261, 266
See application file for complete search history.

(56) References Cited

U.S. PATENT DOCUMENTS

| | | | |
|---|---|---|---|
| 3,880,449 | A | 4/1975 | Wada |
| 3,981,516 | A | 9/1976 | Haggkvist |
| 4,429,760 | A | 2/1984 | Koizumi |
| 4,432,561 | A | 2/1984 | Feikema |
| 4,634,137 | A | 1/1987 | Cocksedge |
| 4,743,102 | A | 5/1988 | Pareigat |
| 5,678,835 | A | 10/1997 | Sung et al. |
| 5,730,453 | A | 3/1998 | Owsen |
| 5,941,548 | A | 8/1999 | Owsen |
| 2004/0094931 | A1 | 5/2004 | Ackley |
| 2006/0086555 | A1 | 4/2006 | Dower |
| 2007/0152422 | A1 | 7/2007 | Lin |
| 2011/0175321 | A1 | 7/2011 | Kuboyama |
| 2012/0104722 | A1 | 5/2012 | Gunderson |
| 2013/0193668 | A1 | 8/2013 | Decker |
| 2013/0221633 | A1 | 8/2013 | Jankura |

(Continued)

FOREIGN PATENT DOCUMENTS

CN 206307218 U * 7/2017

*Primary Examiner* — Valentin Neacsu
*Assistant Examiner* — Morgan Knauf
(74) *Attorney, Agent, or Firm* — PARK LAW FIRM

(57) ABSTRACT

In the conventional tricycle, generally the front frame, the rear frame and the seat tube are attached to the bottom bracket that carries pedal assembly. Between the bottom bracket and the rear frame, a joint is installed such that the seat tube and the handlebar may tilt to the left or right. Thereby the rider can cancel out the unwanted centrifugal force that occurs during high speed turning and pushes him to the opposite direction of the handlebar causing a fall down accident. Between the seat tube and the rear frame is installed a tiltable angle variable mechanism. By operating a hand lever on the handlebar the rider can vary the tiltable angle of the handlebar as needed, for high speed turning or for maintaining balance at low speeds.

2 Claims, 2 Drawing Sheets

(56)　　　　　　References Cited

U.S. PATENT DOCUMENTS

| | | | |
|---|---|---|---|
| 2015/0061312 A1* | 3/2015 | Ishige | ................... B62J 45/413 |
| | | | 296/65.01 |
| 2016/0221628 A1 | 8/2016 | Trifaro | |
| 2021/0269115 A1 | 9/2021 | Shintani | |
| 2023/0257055 A1 | 8/2023 | Augustin | |
| 2024/0017787 A1 | 1/2024 | Knapp | |
| 2024/0246630 A1 | 7/2024 | Raffaelli | |

* cited by examiner

TRICYCLE HAVING MAXIMUM TILTABLE ANGLE VARIABLE SYSTEM

BACKGROUND OF INVENTION

This invention is related to a tricycle, particularly having a tiltable angle variable system. The conventional three-wheeled tricycle is safe and will not fall down during low speed riding or stopping. The reason is that the front wheel and the rear two wheels are placed on a triangle line on the ground. But, when the rider turns the handlebar to change the direction, all three wheels make circular tracks on the ground. However, his weight center tends to move straight by the inertia. Therefore, his weight center shifts to the opposite direction of the handlebar, sometimes causing a fall down accident. This force that pushes him to the opposite direction of the handlebar during turning is known as the centrifugal force.

One of prior arts offering the way to eliminate such an unwanted centrifugal force during turning is U.S. patent Ser. No. 12/377,931 by Kim. In the prior art, the handlebar and the seat tube are tiltable for the rider to cancel out the centrifugal force. And the tension spring protects the rider from the excessive tilting motion and helps him to return the handlebar to vertical direction from the tilted position. But at very low speeds, it is hard for the rider to maintain balance because the tension device does not work sufficiently near the mid position to hold the seat tube vertically firmly.

Accordingly, the object of the present invention is to propose a tricycle which has the tiltable handlebar, seat tube, and enables the rider to maintain balance at very low speeds without falling down.

SUMMARY OF THE INVENTION

In the prior art above, the tension spring is replaced with a longitudinal bar frame. To the backside of the seat tube a triangular frame is attached. The bar frame is longitudinally swingably attached to an upright extension frame of the rear connecting frame and swings within the triangle frame.

By operating a hand lever attached on the handlebar like a derailleur twist shifter lever, the rider can enable the bar frame to swing up and down and can vary tiltable angle of the triangle frame, in turn the tiltable angle of the seat tube and the handlebar as needed for cancelling the centrifugal force at high speeds, or for maintaining balance safely at low speeds.

DETAILED DESCRIPTION EMBODIMENT OF THE INVENTION

Figure 1:
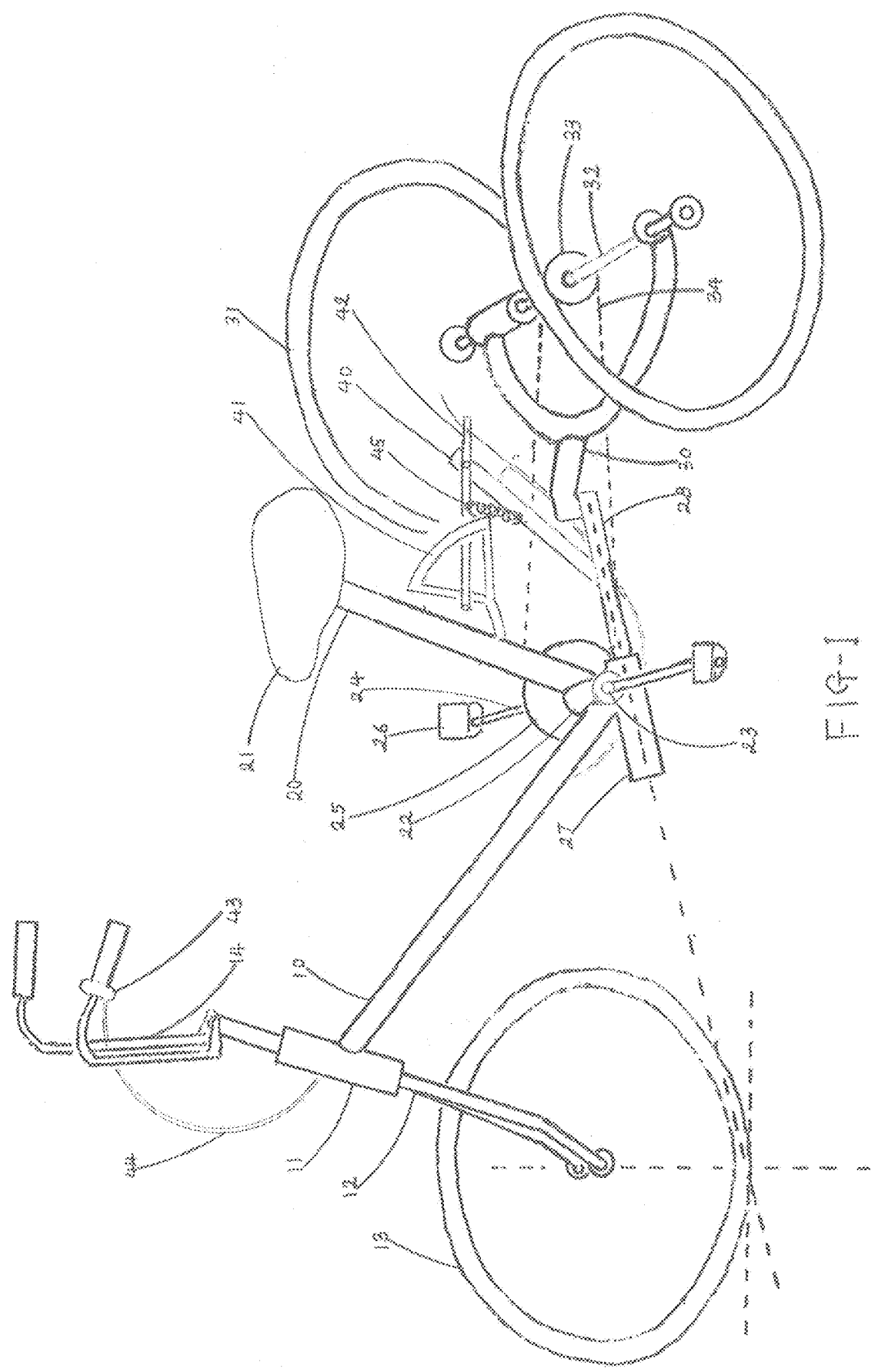
FIG. 1 is the perspective side-view of the preferred embodiment of the invention.
Figure 2:
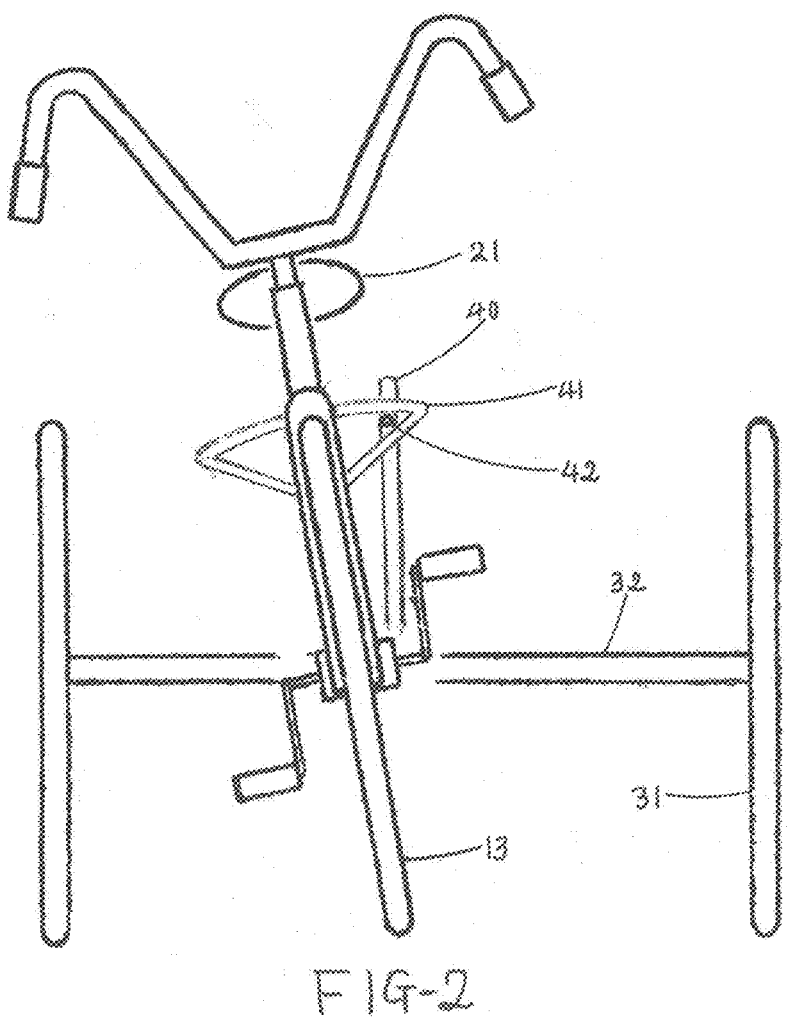
FIG. 2 is the front view of the embodiment where the handlebar and the seat tube are tilted.

In the FIG. 1, the medially standing seat tube 20 is attached to the bottom bracket 22. The seat 21 is attached to the seat tube 20 at the upper end. The bottom bracket 22 rotatably encloses a spindle 23. Two pedal-arms 24 are attached to the spindle 23 at each end thereof. The front sprocket wheel 25 is attached to one of two pedal-arms 24. Each of two pedals 26 is attached to each of the two pedal-arms 24.

The front frame 10 is attached to the bottom bracket 22 and to the head tube 11. The front fork 12 is rotatably attached to the head tube 11 for rotation therein. The front wheel 13 is attached to the front fork 12. The handlebar 14 is attached to the front fork 12 at the upper end thereof.

Two rear wheels 31 are attached to the transverse axle 32 at each end.

The transverse axle 32 is rotatably attached to the rear frame 30. The rear sprocket wheel 33 is attached to the axle 32 medially thereof. The cylindrical front connecting frame 27 is attached to the bottom bracket 22. The round rear connecting frame 28 is attached to the rear frame 30. The front connecting frame 27 is rotatably attached to the rear connecting frame 28 to rotate around the longitudinal axis of the rear connecting frame 28.

As a result, the front frame 10 and the seat tube 20 are tiltable to the left or right. It is obvious that the cylindrical front connecting frame 27 is switchable with the round rear connecting frame 28 to each other without making any difference. An endless chain belt 34 is mounted on the front sprocket wheel 25 and on the rear sprocket wheel 33 to transmit rotation motion of pedals 26 to one of the two rear wheels 31 for propelling. The other one of the two rear wheels 31 is idling to compensate for the speed difference therebetween. Thus, by tilting the handlebar 14 to the left or right, the rider can cancel out the unwanted centrifugal force that occurs during high speed turning and pushes him to the opposite direction of the handlebar 14 causing a fall down accident.

In order to maintain balance safely during low speed riding, a tiltable angle variable system is provided. The system comprises a triangular frame 41 attached to the seat tube 20, a longitudinal bar frame 42 swingably attached to an upright extension frame 40 of the rear connecting frame 28 and swingable up and down in the triangular frame 41, a hand lever 43 attached to the handlebar 14 to enable remotely the bar frame 42 to swing, and a driveline 44 between the hand lever 43 and the bar frame 42, such as the brake cable of the bicycle.

The hand lever 43 has the structure of the brake lever or the derailleur twist shifter lever of the bicycle. The longitudinal bar frame 42 is normally positioned at its lowest position in the triangular frame 41 by the tension spring 45 and holds the triangular frame 41 not to tilt.

By operating the hand lever 43, the rider can enable the bar frame 42 to move up or down and in turn can vary the tiltable angle of the triangular frame 41, in turn the tiltable angle of the seat tube 20 and the handlebar 14 as needed, particularly for slow riding. It is obvious that the triangular frame 41 and the longitudinal bar frame 42 are switchable to each other without making any difference.

What is claimed is:

1. A tricycle comprising, a front wheel, two rear wheels, a medial seat tube, a seat attached to the seat tube at an upper position thereof, a bottom bracket attached to the seat tube at a lower position thereof, the bottom bracket being rotatably enclosing a spindle, two pedal-arms attached to the spindle at each end thereof, a sprocket wheel attached to one of the two pedal-arms, two pedals attached to each of the two pedal-arms, a front frame attached to the bottom bracket and to a head tube, a front fork rotatably attached to the head tube for rotation therein, the front wheel being attached to the front fork, a handlebar attached to the front fork at an upper position thereof for a rider to steer the front wheel thereby, the two rear wheels being attached to a transverse axle at each end thereof, the transverse axle being rotatably attached to a rear frame, a second sprocket wheel attached to the transverse axle, a front connecting frame attached to the bottom bracket, a rear connecting frame attached to the rear frame, the front connecting frame being rotatably attached to the rear connecting frame to rotate around a longitudinal axis of the rear connecting frame, an endless chain belt mounted on the two sprocket wheels, whereby the rider can pedal for propelling and can tilt the handlebar to the left or right to cancel out an unwanted centrifugal force that occurs during turning and pushes him to opposite direction of the handlebar causing a fall down accident, and the tricycle further comprising a tiltable angle variable system, the system comprising a triangular frame attached to the seat tube, a longitudinal bar frame swingably attached to an upright extension frame of the rear connecting frame and swingable up or down in the triangular frame, a hand lever attached on the handlebar for the rider to enable the longitudinal bar frame to swing, a driveline between the hand lever and the longitudinal bar frame, whereby, the rider can operate the hand lever and enable the longitudinal bar frame to move up or down in the triangular frame and can vary the tiltable angle of the seat tube and the handlebar as needed, particularly for slow riding.

2. The tricycle of claim 1, wherein the hand lever has a structure of a brake lever or a derailleur twist shifter lever of a bicycle, and the driveline has a structure of a brake cable or derailleur cable of a bicycle.

* * * * *